(12) United States Patent
Hasegawa et al.

(10) Patent No.: US 7,504,649 B2
(45) Date of Patent: Mar. 17, 2009

(54) RADIOGRAPHIC IMAGE CONVERSION PANEL AND RADIOGRAPHIC IMAGE ACQUISITION SYSTEM

(75) Inventors: Ken Hasegawa, Kanagawa (JP); Seiji Tazaki, Kanagawa (JP); Takao Kuwabara, Kanagawa (JP); Tatsuya Taneichi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/589,219

(22) Filed: Oct. 30, 2006

(65) Prior Publication Data
US 2007/0096040 A1   May 3, 2007

(30) Foreign Application Priority Data
Oct. 28, 2005 (JP) ............................... 2005-314762
Feb. 16, 2006 (JP) ............................... 2006-039098

(51) Int. Cl.
  *G03B 42/08* (2006.01)
(52) U.S. Cl. ...................... 250/586; 250/581; 250/582; 250/584; 250/585
(58) Field of Classification Search ........................ None
  See application file for complete search history.

(56) References Cited

U.S. PATENT DOCUMENTS

| | | | | |
|---|---|---|---|---|
| 4,710,875 A | * | 12/1987 | Nakajima et al. | 378/162 |
| 4,760,256 A | * | 7/1988 | Ohgoda et al. | 250/588 |
| 5,981,968 A | * | 11/1999 | Nakazawa | 250/587 |
| 2003/0178590 A1 | * | 9/2003 | Yasuda et al. | 250/587 |

FOREIGN PATENT DOCUMENTS

| | | |
|---|---|---|
| JP | 64-086759 A | 3/1989 |
| JP | 2000-013599 A | 1/2000 |
| JP | 2004-117684 A | 4/2004 |

* cited by examiner

*Primary Examiner*—David P Porta
*Assistant Examiner*—Yara B Green
(74) *Attorney, Agent, or Firm*—Sughrue Mion, PLLC

(57) ABSTRACT

The radiographic image conversion panel includes a recording layer formed of a first accumulative phosphor that is irradiated with a radiation as a first primarily exciting light beam to excite primarily and accumulate energy, and is irradiated with a first secondarily exciting light beam to excite secondarily and generate a stimulating light beam and a correction marker for detecting a position formed of a second accumulative phosphor that is irradiated with a second primarily exciting light beam to excite primarily and accumulate the energy, and is irradiated with a second secondarily exciting light beam to excite secondarily and generate light with a wavelength shorter than a wavelength of the first secondarily exciting light beam. The radiographic image acquisition system uses the radiographic image conversion panel.

21 Claims, 13 Drawing Sheets

RADIOGRAPHIC IMAGE CONVERSION PANEL AND RADIOGRAPHIC IMAGE ACQUISITION SYSTEM

BACKGROUND OF THE INVENTION

The present invention relates to a radiographic image conversion panel that is irradiated with an exciting light beam to generate a stimulating light beam, and a radiographic image acquisition system using the radiographic image conversion panel. In particular, the invention relates to a radiographic image conversion panel having a position detecting marker of a recorded radiographic image, and a radiographic image acquisition system.

Up to now, a radiographic image recording/reproducing system composed of a radiographic image recording apparatus, and a radiographic image reading apparatus is known as a computed radiography (CR) system, which records a radiographic image of a subject such as a human body on an accumulative phosphor layer once as a latent image, irradiates the accumulative phosphor layer with an exciting light beam such as laser light to generate a stimulating light beam, and photoelectrically detects the stimulating light beam to acquire an image signal representing the radiographic image of the subject, using an accumulative phosphor (stimulable phosphor) that is irradiated with a radiation such as an X-ray to accumulate a part of the radiation energy, and then, is irradiated with an exciting light beam such as visible light to exhibit stimulating light-emission in accordance with the accumulated radiation energy.

As a recording medium used in the radiographic image recording/reproducing system, a radiographic image conversion panel produced by stacking an accumulative phosphor layer on a substrate is used. The radiographic image conversion panel releases remaining radiation energy when irradiated with an erasing light beam to become capable of recording a radiographic image again. Thus, the radiographic image conversion panel can be used repeatedly.

The radiographic image conversion panel used in the above-mentioned radiographic image recording/reproducing system is acquired in such a manner that the accumulative phosphor layer as a recording layer is formed on a support by a method such as vapor-deposition to produce a phosphor sheet, and then the phosphor sheet is placed in a package, such as moisture proof package, which is then formed into a panel. For the radiographic image conversion panel thus formed, it is important to be free from major structural defects that result from vapor-deposition unevenness of the accumulative phosphor layer during the vapor-deposition step. Needless to say, if the defects are negligible, they do not influence diagnosis. However, if the defects are at a predetermined level or higher, they influence diagnosis, and therefore it is necessary to perform some countermeasures against the defects before using the radiographic image conversion panel having such level of defects.

Further, as the above-mentioned radiographic image reading apparatus, for example, an apparatus is known, which includes a line sensor for detecting a stimulating light beam generated from a radiographic image conversion panel when irradiated with a linear exciting light beam, and transfer means for transferring the line sensor relatively in a direction orthogonal to the direction of the linear exciting light beam with respect to the radiographic image conversion panel, and is irradiated with the linear exciting light beam to detect the stimulating light beam generated from the radiographic image conversion panel, while transferring the line sensor relatively with respect to the radiographic image conversion panel, thereby acquiring a radiographic image.

The radiographic image acquired as described above is subjected to shading correction or the like for removing the influence of light-emission unevenness by the stimulating light beam, and is recorded on a film as a visible image or displayed on a high-precision CRT, thereby being used for diagnosis.

As a technique related to the shading correction used herein, for example, the following is known: a radiographic image (i.e., a radiographic image for correction) read from a radiographic image conversion panel that is uniformly exposed to a radiation (hereinafter referred to as uniform exposure, or solid exposure) is stored previously in an apparatus, then, a radiographic image (i.e., a radiographic subject image) read from the radiographic image conversion panel exposed to a radiation through a subject is acquired, and the radiographic image for correction is subtracted from the radiographic subject image to acquire a radiographic image (corrected radiographic image) with the influence of shading removed (for example, see JP 2000-013599 A and JP 64-086759 A).

However, according to the above technique, the variation in the arrangement position of the radiographic image conversion panel on the radiographic image recording apparatus and the radiographic image reading apparatus when the radiographic image for correction is recorded is not considered, which causes a problem in that a positional displacement error is not corrected.

In order to solve the above problem, the applicant of the present invention has proposed a technique of performing a position correction regarding the shading correction in Japanese Patent Application No. 2002-279248 "Radiographic image acquisition method and apparatus" (see JP 2004-117684 A).

According to this technique, a light-emitting marker for specifying the position on the radiographic image conversion panel is placed outside of a main image area of the radiographic image conversion panel, and the position specified by the light-emitting marker is read, whereby the position of the radiographic image conversion panel itself is specified.

More specifically, the technique disclosed by JP 2004-117684 A, is based on the idea that the transfer positional displacement of the radiographic image conversion panel is corrected at a time of recording, and after the transfer positional displacement is corrected, a predetermined correction (such as shading correction or other corrections for removing the influence of light-emission unevenness) is performed. In this technique, the light-emitting marker for specifying the position on the radiographic image conversion panel is placed outside of a main image area of the radiographic image conversion panel, whereby the convenience of a correction operation and the reliability of correction results higher than those in the previous techniques can be obtained.

SUMMARY OF THE INVENTION

In JP 2004-117684 A, a stokes type phosphor or infrared phosphor that emits light with a wavelength longer than that of the exciting light beam (laser light with a wavelength of 600-660 nm, for example) of the radiographic image acquisition apparatus is used as a light-emitting marker so that position correction is performed with the emission light generated from the light-emitting marker, that has a wavelength (from near infrared to infrared) longer than the exiting light beam. However, according to the study conducted by the inventor of the present invention, a light-receiving element provided in a line sensor of the radiographic image acquisition apparatus is mostly designed so as to have high sensitivity at a light-emission wavelength of an accumulative phosphor, i.e., a wavelength shorter than that of an exciting light beam, and hence, the sensitivity thereof may not be sufficient in the near-infrared to infrared region. For example, a system using a CCD as the light receiving element, in general, has a filter for eliminating the light in the near-infrared region, because such wavelength region is the light emitting region of organic substances such as dyes. Accordingly, there may be a problem in which emission light from the light-emitting marker is cut by the filter, and therefore it is difficult to obtain a desired amount of light. In a system using a photomultiplier as the light receiving element, there may be a problem in which such photomultiplier does not have enough sensitivity in the near-infrared to infrared region, because from the original purpose it is advantageous in most cases to employ a photomultiplier having high sensitivity in a wavelength of about 400 nm, that is the wavelength region of the stimulating light beam from the accumulative phosphor layer.

The present invention has been made to further improve the technique disclosed in JP 2004-117684 A, and has an object to provide a radiographic image conversion panel and a radiographic image acquisition system capable of specifying the position in a radiographic image conversion panel that has acquired a radiographic image, thereby acquiring a radiographic image of high quality with the influence of light-emission unevenness of a stimulating light beam removed exactly.

In order to achieve the above-mentioned object, a radiographic image conversion panel according to the present invention includes: a recording layer formed of a first accumulative phosphor that is irradiated with a radiation as a first primarily exciting light beam to excite primarily and accumulate energy, and is irradiated with a first secondarily exciting light beam to excite secondarily and generate a stimulating light beam; and a correction marker for detecting a position which is formed of a second accumulative phosphor that is irradiated with a second primarily exciting light beam to excite primarily and accumulate the energy, and is irradiated with a second secondarily exciting light beam to excite secondarily and generate light with a wavelength shorter than a wavelength of the first secondarily exciting light beam.

In the radiographic image conversion panel according to the present invention, it is preferable that the correction marker be provided outside of an image recording region (image region) of the recording layer.

Further, it is preferable that the radiographic image conversion panel further comprise a supporting substrate, and the correction marker is provided on a part of the supporting substrate.

Further, it is preferable that the second primarily exciting light beam is different from the first primarily exciting light beam.

Further, it is preferable that the second primarily exciting light beam is light capable of erasing the energy accumulated in the first accumulative phosphor and the second secondarily exciting light beam is the first secondarily exciting light beam capable of secondarily exciting the first accumulative phosphor.

Further, a radiographic image acquisition system according to the present invention using the above-mentioned radiographic image conversion panel includes: a exciting light source or sources from that the first and second secondarily exciting light beams are radiated on the radiographic image conversion panel; detecting means for receiving a first stimulating light beam that is generated by the first accumulative phosphor on the recording layer of the radiographic image conversion panel when the first accumulative phosphor is irradiated with the first secondarily exciting light beam from the exciting light source or sources, and a second stimulating light beam that is generated by the second accumulative phosphor on the correction marker of the radiographic image conversion panel when the second accumulative phosphor is irradiated with the second secondarily exciting light beam from the exciting light source or sources, and acquiring a radiographic image signal representing a radiographic image recorded as a latent image on the radiographic image conversion panel, and a marker image signal representing an image of the correction marker; and light-emission unevenness correcting means for correcting a position of each of radiographic images represented by radiographic image signals based on a position of the image of the correction marker represented by the marker image signal from the radiographic image signals related to uniform radiation exposure and radiation exposure photographing a subject and thereafter, acquiring a corrected image signal representing a radiographic image that a influence by light-emission unevenness of the first stimulating light beam is removed, using the radiographic image signals whose position is corrected.

Herein, the light-emission unevenness of the stimulating light beam refers to the unevenness of the intensity of a simulating light beam generated by the difference in light-emission characteristics depending upon the position of the radiographic image conversion panel.

Further, it is preferable that the radiographic image acquisition system according to the present invention further comprise a control section that controls the exciting light source or sources in such a way that primary excitation on the second accumulative phosphor constituting the correction marker is performed by the second primarily exciting light beam at a start-up of the radiographic image acquisition system, or a control section that controls the exciting light source or sources in such a way that primary excitation on the second accumulative phosphor constituting the correction marker is performed by the second primarily exciting light beam at a predetermined time interval after a start-up of the radiographic image acquisition system.

Further, it is preferable that the radiographic image acquisition system according to the present invention further comprise a control section that determines whether or not primary excitation on the second accumulative phosphor constituting the correction marker is performed by the second primarily exciting light beam based on an elapse of time from a previous primary excitation at a start-up of the radiographic image acquisition system, or a control section that determines whether or not primary excitation on the second accumulative phosphor constituting the correction marker is performed by second primarily exciting light beam based on an elapse of time from a previous primary excitation and a light amount of the second stimulating light beam emitted at a time of a previous secondary excitation at a start-up of the radiographic image acquisition system.

Still further, it is preferable that the radiographic image acquisition system according to the present invention further comprise a control section that controls the exciting light source or sources in such a way that the second accumulative phosphor is irradiated with a predetermined second secondarily exciting light beam and determines whether or not primary excitation on the second accumulative phosphor constituting the correction marker is performed by second primarily exciting light beam based on a light amount of the second stimulating light beam generated at this time at a start-up of the radiographic image acquisition system or after an elapse of a predetermined time from the start-up of the radiographic image acquisition system.

In the case of performing primary excitation by the primarily exciting light beam in the radiographic image acquisition system, it is also preferable to change the elapse time, the elapse time and the light amount of the stimulating light beam emitted at a time of the previous primary excitation, and the conditions (excitation light amount, irradiation time, etc.) of the primary excitation in accordance with the light amount of the stimulating light beam.

Further, it is preferable that the radiographic image signal and the marker image signal related to the uniform radiation exposure are a radiographic image signal and a marker image signal detected by the detecting means from the radiographic image conversion panel that is irradiated with an uniform radiation, and the radiographic image signal and the marker image signal related to the radiation exposure photographing the subject are a radiographic image signal and a marker image signal detected by the detecting means from the same radiographic image conversion panel on which the subject is photographed.

Still further, it is preferable that the radiographic image acquisition system according to the present invention further comprise an imaging optical system through which the first and second stimulating light beams are focused on a surface of the detecting means.

According to the present invention, the correction marker added to the radiographic image conversion panel is composed of an accumulative phosphor (second accumulative phosphor), the second accumulative phosphor is first excited (so-called, primarily excited) by the second primarily exciting light beam, for example erasure light with respect to the first accumulative phosphor to accumulate positional information, and at a time of the second secondary excitation, for example, the secondary excitation (corresponding to the second excitation for the second accumulative phosphor) for reading with the second secondarily exciting light beam after recording of an image with respect to the first accumulative phosphor, the second stimulating light beam with a wavelength different from that of the first stimulating light beam from the first accumulative phosphor is emitted, whereby an image signal representing a radiographic image with the influence by the positional displacement of the radiographic image conversion panel removed is acquired. Therefore, the sensitivity of a light-receiving element provided in the radiographic image acquisition apparatus does not receive light-emission from the correction marker in an insufficient wavelength region, and a radiographic image of high quality with the influence of structural defects included in the radiographic image conversion panel removed can be acquired.

Further, in the radiographic image acquisition system according to the present invention, as the second accumulative phosphor constituting the correction marker, light capable of erasing energy accumulated in the first accumulative phosphor as the second primarily exciting light beam can be used, and as the second secondarily exciting light beam, light capable of secondarily exciting the first accumulative phosphor can be used. Therefore, the erasure light of the first accumulative phosphor can be used as an exciting light beam of the second accumulative phosphor, and the above-mentioned effect can be obtained with a simple system configuration.

Further, the radiographic image acquisition system can appropriately address even the case where there is a possibility that the second accumulative phosphor causes fading (decrease in light-emission ability) during the elapse of time after the second primary excitation by the irradiation with the second primarily exciting light beam, and a sufficient light amount of the second stimulating light beam cannot be obtained at a time of secondary excitation.

The methods for compensating for the fading of the second accumulative phosphor in the radiographic image acquisition systems can be combined appropriately.

BRIEF DESCRIPTION OF THE DRAWINGS

In the accompanying drawings:

FIG. 9A shows a radiographic image for correction photographed by a uniform X-ray, and FIG. 9B shows a radiographic subject image photographed by an X-ray having passed through a subject;

FIG. 10A is a plan view showing a scan reading situation of the correction marker, and FIGS. 10B and 10C are graphs each showing an example of reading data;

DETAILED DESCRIPTION OF THE PREFERRED EMBODIMENT

Figure 1A:
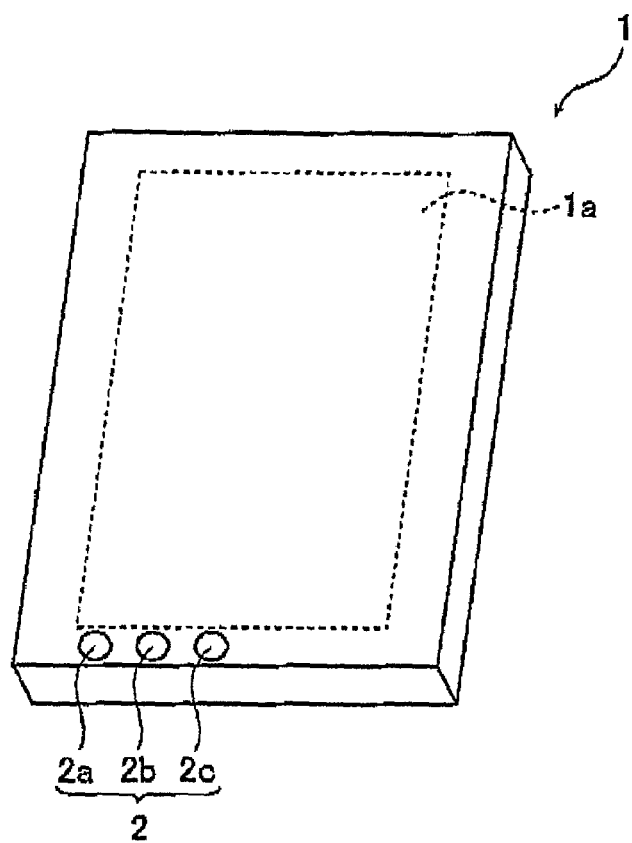
FIGS. 1A and 1B are a perspective view and a cross-sectional view, each showing a schematic configuration of a radiographic image conversion panel according to an embodiment of the present invention.
Figure 1B:
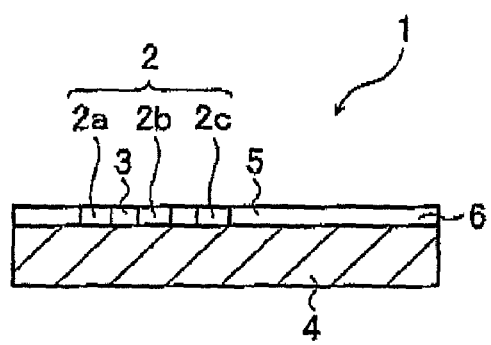
Figure 2A:
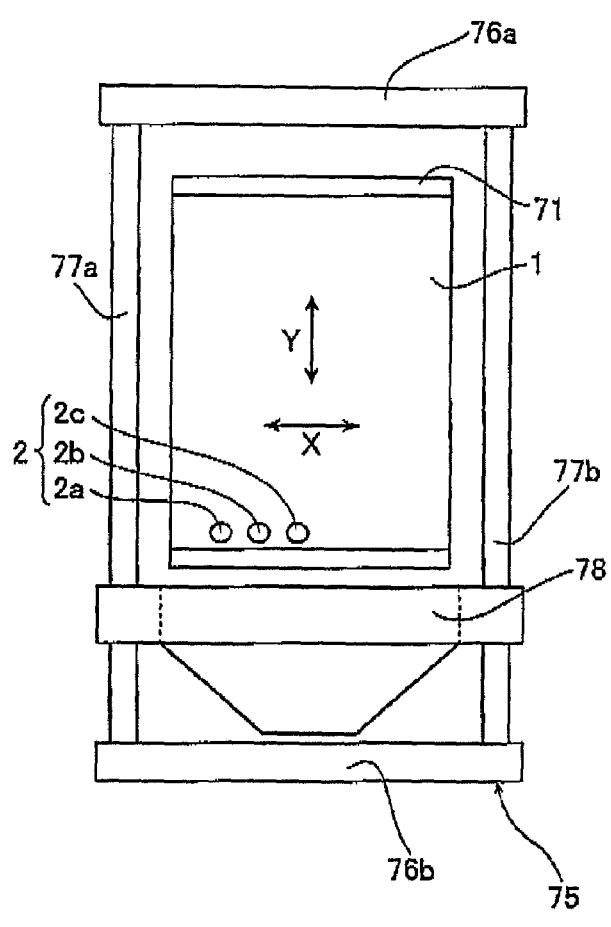
FIGS. 2A and 2B are a front view and a side view each showing a schematic configuration of a radiographic image reading apparatus for reading a radiographic image from the radiographic image conversion panel.
Figure 2B:
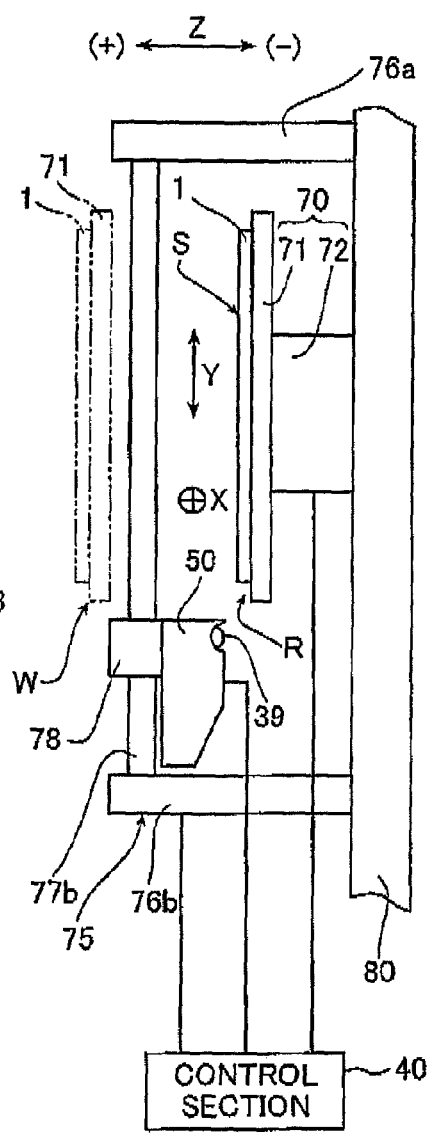
Figure 3:
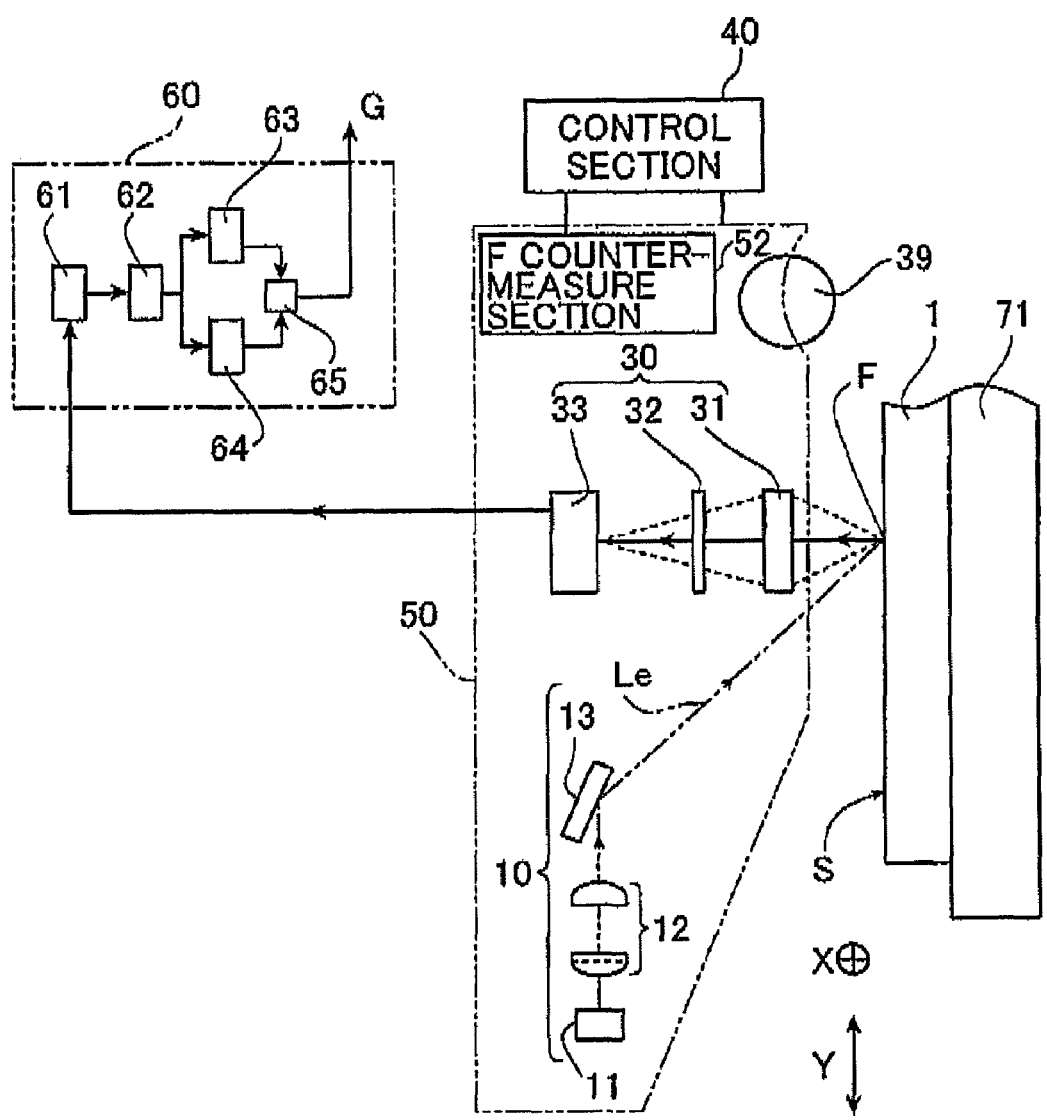
FIG. 3 is a cross-sectional view showing an internal configuration of a reading section in which a light source and a line sensor of the radiographic image reading apparatus shown in FIGS. 2A and 2B are provided integrally.
Figure 4:
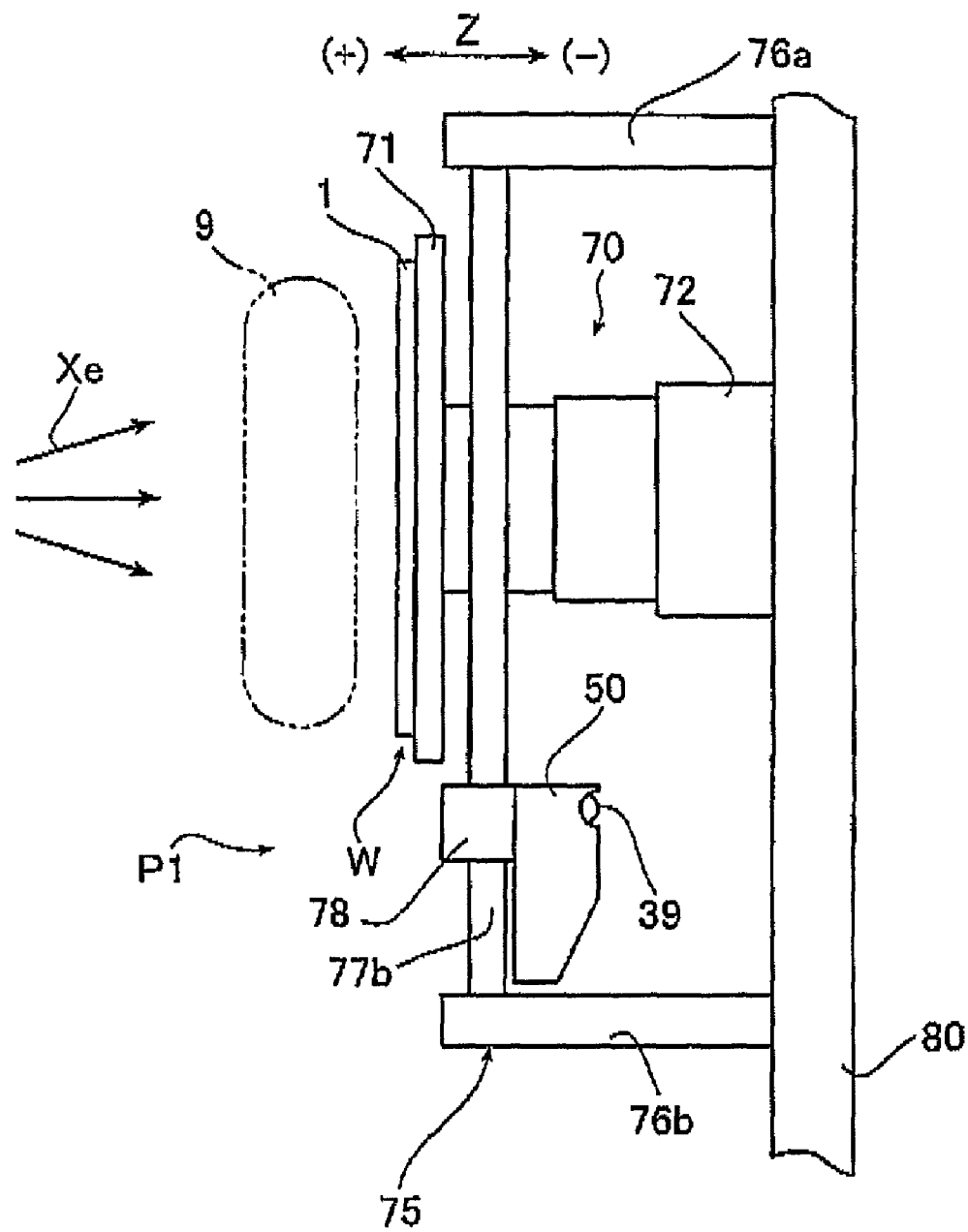
FIG. 4 is a side view showing a state in which the radiographic image conversion panel of the radiographic image reading apparatus shown in FIG. 2B is placed at a radiographic image recording position.
Figure 5:
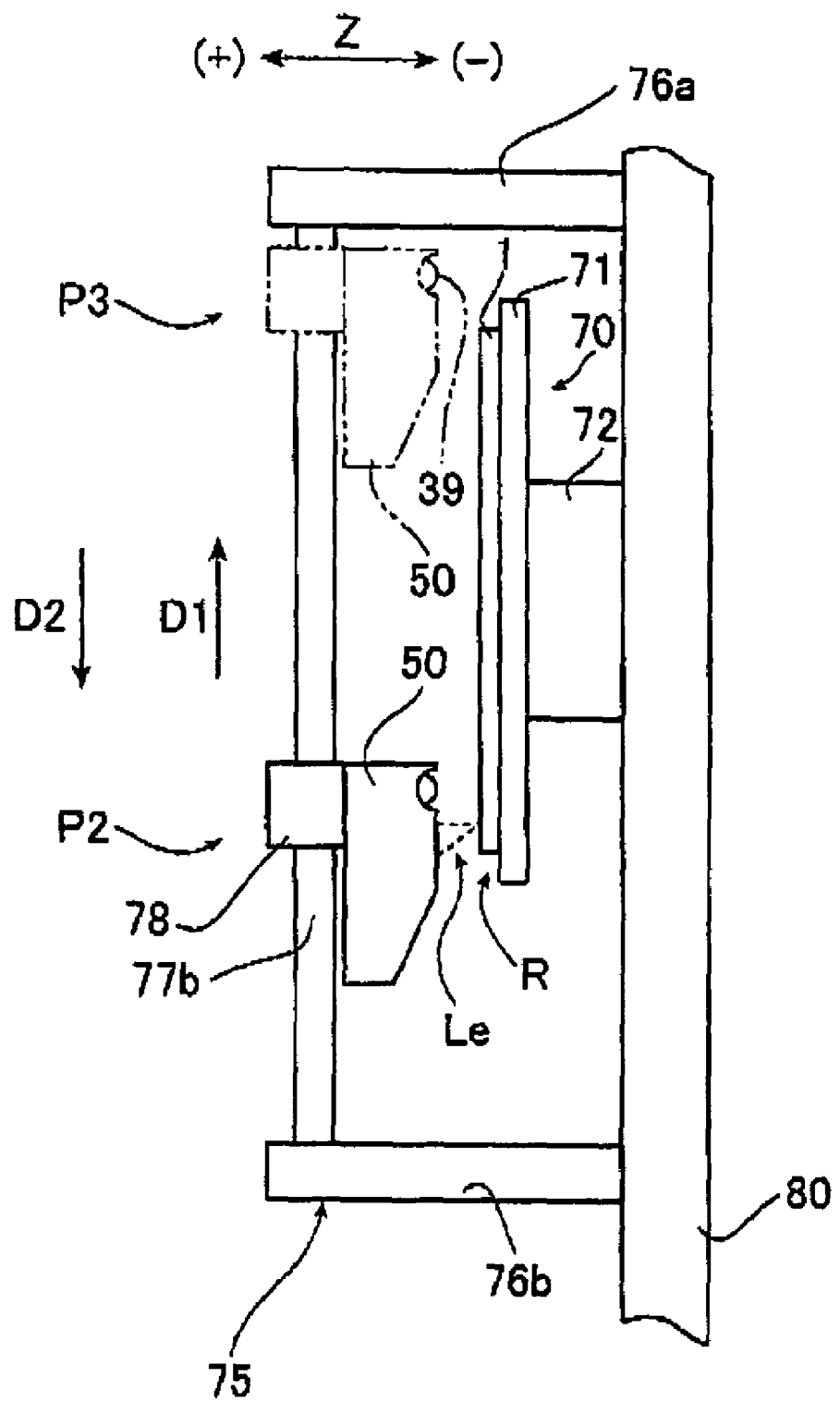
FIG. 5 is a side view showing a state in which the radiographic image conversion panel of the radiographic image reading apparatus shown in FIG. 2B is placed at a radiographic image reading position.
Figure 9A:
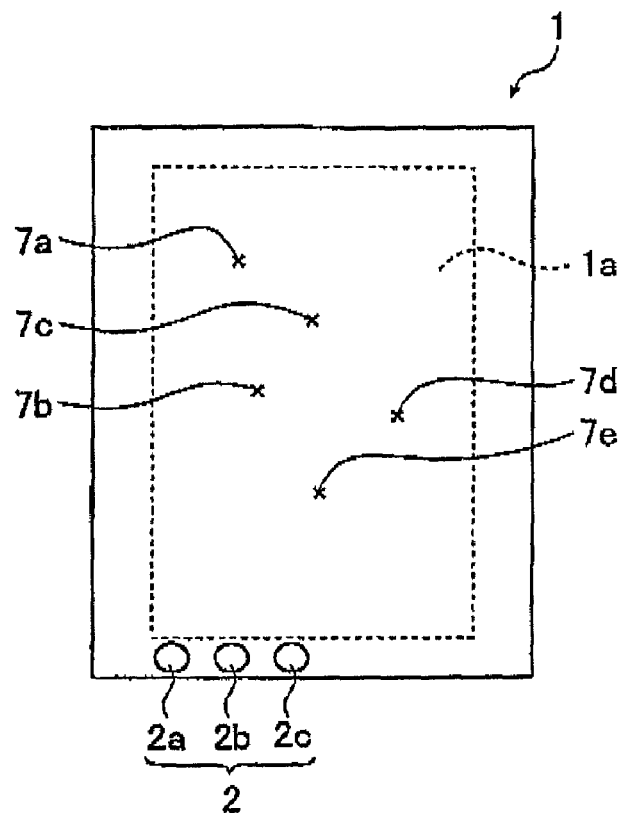
FIGS. 9A and 9B show an image of a radiographic image conversion panel together with an image of a correction marker.
Figure 9B:
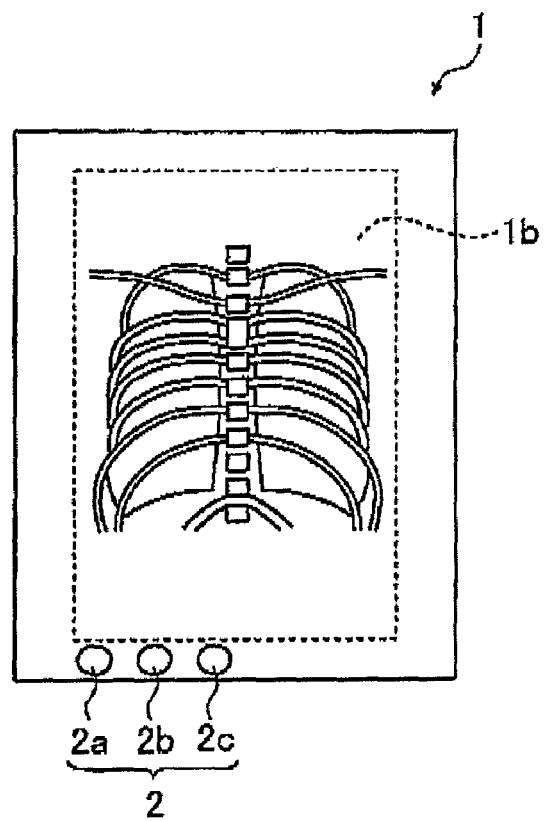
Figure 10A:
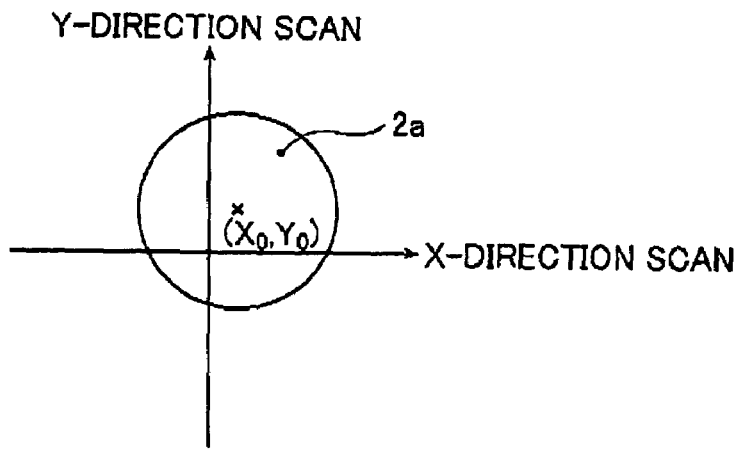
FIGS. 10A, 10B, and 10C respectively illustrate a method of determining the position of a correction marker from an image of a correction marker.
Figure 10B:
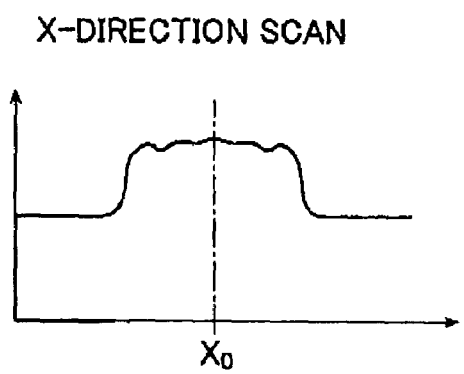
Figure 10C:
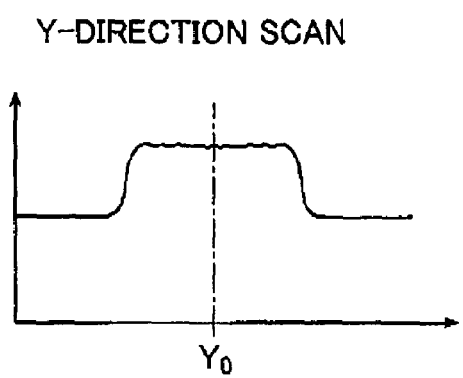
Figure 11:
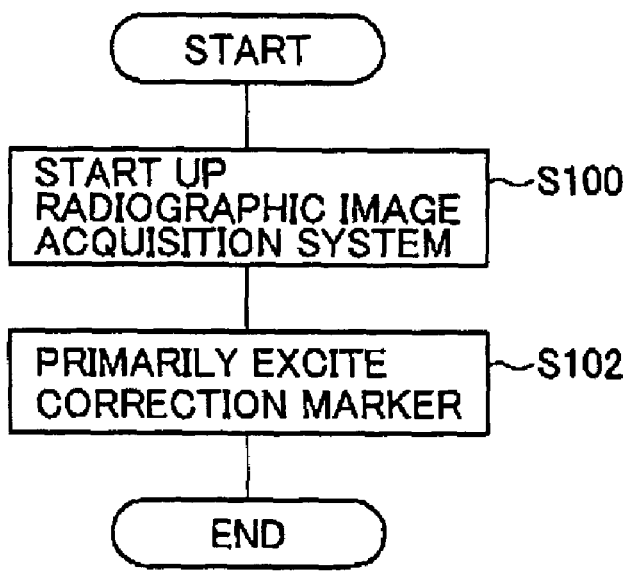
FIG. 11 is a flowchart (I) showing an exemplary method of addressing fading of a second accumulative phosphor in a radiographic image acquisition system.

Hereinafter, an embodiment of the present invention will be described with reference to the drawings. FIGS. 1A and 1B are a perspective view and a cross-sectional view each showing a schematic configuration of a radiographic image conversion panel according to an embodiment of the present invention. FIGS. 2A and 2B are respectively a front view and a side view showing a schematic configuration of an embodiment of a radiographic image reading apparatus for reading a radiographic image from the radiographic image conversion panel. FIG. 3 is a cross-sectional view showing an internal configuration of a reading section in which a light source and a line sensor of the radiographic image reading apparatus shown in FIGS. 2A and 2B are provided integrally. FIG. 4 is a side view showing a state in which a radiographic image conversion panel of the radiographic image reading apparatus shown in FIG. 2B is placed at a radiographic image recording position. FIG. 5 is a side view showing a state in which a radiographic image conversion panel of the radiographic image reading apparatus shown in FIG. 2B is placed at a radiographic image reading position. FIGS. 6 to 8B are flowcharts each illustrating an operation of correcting a radiographic image reading positional displacement using the radiographic image conversion panel according to this embodiment. FIGS. 9A and 9B respectively show an image of a radiographic image conversion panel together with an image of a correction marker. FIGS. 10A, 10B, and 10C respectively illustrate a method of determining the position of a correction marker from an image of a correction marker.

As shown in FIG. 1A, a radiographic image conversion panel 1 according to this embodiment includes correction markers 2 (2a, 2b, 2c, and so on) for detecting a position, which generates light capable of passing through a subsequently described exciting light beam cut-filter (32; see FIG. 3) on an outside (i.e., outside of an image region) of a main image recording region (hereinafter, simply referred to as image region) 1a of the radiographic image conversion panel 1.

Herein, as an example, the case where the radiographic image conversion panel 1 includes a plurality of correction markers 2 (2a, 2b, 2c, and so on) is shown. In the following description, particularly for simplicity of the description of an operation, the case where only one correction marker 2 is provided will be described.

In the example shown in FIG. 1B, as a preferable example, an accumulative phosphor (corresponding to the above-mentioned first accumulative phosphor) constituting the recording layer 3 which forms the image region 1a of the radiographic image conversion panel 1, is formed of a phosphor layer made of CsBr:Eu that is an accumulative phosphor on a supporting substrate 4 by performing two-dimensional vacuum vapor-deposition by resistance heating, using cesium bromide (CsBr) to be a phosphor component and europium bromide ($EuBr_x$ (x is generally 2 to 3, and in particular, preferably 2)) to be an activator component as film-formation materials.

Further, as the accumulative phosphor (corresponding to the above-mentioned second accumulative phosphor) constituting the correction marker 2, a phosphor layer is formed, which is capable of recording information with light of a cold-cathode tube fluorescent lamp (which is white color and includes light having a wavelength of 400 nm) used as erasure light with respect to the above-mentioned accumulative phosphor CsBr:Eu, and is made of $Sr_4Al_{14}O_{25}$:Eu, Sm that emits light with a wavelength (of about 400 nm to 600 nm, peak: about 500 nm) shorter than that of a secondarily exciting light beam with a wavelength of 660 nm used with respect to the above-mentioned accumulative phosphor CsBr:Eu.

Needless to say, any other layers, as long as they provide predetermined characteristics (an exciting wavelength, a light-emission wavelength, etc.) may also be used as a first accumulative phosphor layer 5 constituting the recording layer 3 which forms the image region 1a, or a second accumulative phosphor layer 6 forming the correction marker 2. For example, the second accumulative phosphor layer 6 forming the correction marker 2 may be of any phosphor as long as it emits a stimulating light beam having a wavelength shorter than the exciting wavelength (wavelength of the secondarily exciting light) of the first accumulative phosphor layer 5 constituting the recording layer 3. The primarily exciting light beam preferably has a wavelength different from the wavelength of the radiation as the primarily exciting light beam with which the first accumulative phosphor layer 5 is irradiated to accumulate radiation energy. Further, the secondarily exciting light beam for allowing the second accumulative phosphor layer 6 to emit a stimulating light beam is preferably the secondarily exciting light beam for secondarily exciting the first accumulative phosphor layer 5 to emit a stimulating light beam.

As shown in FIG. 1B, the above-mentioned correction marker 2 (hereinafter, represented by the correction marker 2a) can be produced and arranged by, for example, producing the radiographic image conversion panel 1 composed of a phosphor sheet made of the accumulative phosphor layer 5 constituting the recording layer 3 which forms the image region 1a, and thereafter, cutting another phosphor sheet for a correction marker formed separately into a predetermined shape and attaching it to an outside of the image region 1a, for example, on the support substrate 4, excluding the recording layer 3. There is no limitation in forming the correction marker 2. The accumulative phosphor layer 5 may be formed in the image region 1a on the support substrate 4 of the radiographic image conversion panel 1, and the accumulative phosphor layer 6 may be formed outside of the image region 1a. Or, the accumulative phosphor layer 5 may be formed, as the recording layer 3, on the entire surface of the support substrate 4 of the radiographic image conversion panel 1, and the accumulative phosphor layer 6 constituting the correction marker 2 may be formed outside of the image region 1a on the recording layer 3, or may be attached thereto as a phosphor sheet.

In the case of reading the radiographic image conversion panel 1 with a plurality of line scanners when checking the presence/absence of a structural defect on an accumulative phosphor layer (described later), it is necessary that the correction marker 2a is formed in accordance with the number of line scanners to be used, an arrangement pitch thereof, etc. This enables the position of a structural defect present in the image region 1a of the radiographic image conversion panel 1 to be read efficiently and exactly.

The radiographic image reading apparatus for reading a radiographic image from the above-mentioned radiographic image conversion panel 1 will be described with reference to FIGS. 2A, 2B, and 3.

In the figures, reference numeral 10 denotes a light source for emitting a linear exciting light beam, reference numeral 30 denotes a line sensor that is detecting means for receiving a stimulating light beam generated from the radiographic image conversion panel 1 as a result of the irradiation with an exciting light beam, subjecting the stimulating light beam to photoelectric conversion, and acquiring an image signal indicating a radiographic image, and reference numeral 70 denotes a panel base moving section for switching the radiographic image conversion panel 1 between a radiographic image recording position W and a radiographic image reading position R.

Further, reference numeral 75 denotes a linear slide system for moving a reading section 50 in which the above-mentioned light source 10 and the line sensor 30 are provided integrally in a direction (hereinafter, referred to as sub-scanning direction (Y-direction)) orthogonal to the direction (hereinafter, referred to as main scanning direction (X-direction)) of the above-mentioned linear exciting light beam, and reference numeral 60 denotes an image data processing section that is data processing means having a function for converting the image signal acquired in the line sensor 30 from a digital value to image data to determine the above-mentioned structural defect, etc.

The radiographic image reading apparatus shown in the drawings also includes a control section 40 that controls operation in each section of the radiographic image reading apparatus, as well as operation of the entire sections, for example, reading operation in which the reading section 50 reads a radiographic image and an image of the correction marker 2 from the radiographic image conversion panel 1, erasing operation of the radiographic image, and image recording (exciting) operation of the correction marker.

The light source 10 is composed of a broad area laser 11 for emitting a linear exciting light beam, an optical system 12 formed of a toric lens or the like for condensing the exciting light beam generated from the broad area laser 11 in a linear region F extending in the main scanning X direction (direction vertical to the drawing surface of FIG. 3) on the radiographic image conversion panel 1 through a reflective mirror 13 (described later), a reflective mirror 13 for reflecting the linear exciting light beam emitted through the optical system 12 to change an optical path of the exciting light beam, and the like.

The line sensor 30 includes an image-forming lens 31, an exciting light beam cut-filter 32, and a CCD element 33. The image-forming lens 31 has a large number of lenses arranged in the main scanning X direction and allows the linear region F on the radiographic image conversion panel 1 irradiated with the above-mentioned linear exciting light beam to form an image on the CCD element 33. The CCD element 33 has a large number of light-receiving sections (photoelectric converting elements) arranged in the main scanning X direction, and detects a stimulating light beam generated from the above-mentioned linear region F that forms an image by the above-mentioned image-forming lens 31. The exciting light beam cut-filter 32 is inserted between the image-forming lens 31 and the CCD element 33, and blocks an exciting light beam mixed in the stimulating light beam generated from the radiographic image conversion panel 1 to transmit the stimulating light beam.

The above-mentioned light source 10 and the line sensor 30 are provided integrally in the reading section 50, and the reading section 50 includes a fluorescent lamp for erasure 39 extending in the main scanning X direction, which irradiates the radiographic image conversion panel 1 with erasure light for erasing radiation energy remaining in the radiographic image conversion panel 1 from which a radiographic image has been read, in addition to the above-mentioned light source 10 and line sensor 30.

Further, the above-mentioned light source 10, line sensor 30, and fluorescent lamp for erasure 39 have a width (X-direction length) corresponding to the image region 1*a* of the radiographic image conversion panel 1, and as described later, enables the uniform exposure (excitation) by the fluorescent lamp for erasure 39 of the correction marker 2*a* during scanning for an erasure operation of the radiographic image conversion panel 1, and the reading of the position of the correction marker 2*a* during reading of an image from the image region 1*a* of the radiographic image conversion panel 1.

The panel base moving section 70 is composed of a panel base 71 for fixing the radiographic image conversion panel 1 so that the radiographic image conversion panel 1 stands substantially in a vertical direction, and a cylinder expansion and contraction driving mechanism 72 for holding the panel base 71 via a side opposed to a side of the radiographic image conversion panel 1 of the panel base 71, moving the panel base 71 in a direction (arrow Z direction in the figure) vertical with respect to a surface S of the radiographic image conversion panel 1, and switching the radiographic image conversion panel 1 between the radiographic image recording position W and the radiographic image reading position R. The panel base moving section 70 is fixed onto an apparatus base 8.

The linear slide system 75 is composed of rail bases 76*a* and 76*b* placed on both sides in the sub-scanning Y direction of the panel base 71 so as not to interfere the movement of the panel base 71, and fixed onto the apparatus base 80, guide rails 77*a* and 77*b* whose both ends are provided respectively on the rail bases 76*a* and 76*b*, and which extend in the sub-scanning Y direction, and a reading section movement base 78 that holds the reading section 50 and is guided by the guide rails 77*a* and 77*b* to be moved in the sub-scanning Y direction by driving means (not shown).

The image data processing section 60 includes an A/D converter 61 for converting the image signal acquired in the line sensor 30 from an analog signal to a digital signal, an image buffer 62 for temporarily storing image data converted into the digital signal by the A/D converter 61, and an image memory for correction 63 for storing image data for correction representing a radiographic image (radiographic image for correction) that indicates the position of a structural defect obtained from the radiographic image conversion panel 1 exposed uniformly to a radiation.

The image data processing section 60 includes a subject image memory 64 for storing subject image data representing a radiographic image (subject radiographic image) of a subject including a structural defect obtained from the radiographic image conversion panel 1 exposed to a radiation through the subject, and a correction operating section 65 for receiving image data for correction from the image memory for correction 63, receiving subject image data from the subject image memory 64, correcting the positions from the images of the correction marker 2*a* represented by both the image data, correcting the structural defect by subtracting the image data for correction from the subject image data, and acquiring corrected image data representing the radiographic image (corrected radiographic image) subjected to correction.

Figure 6:
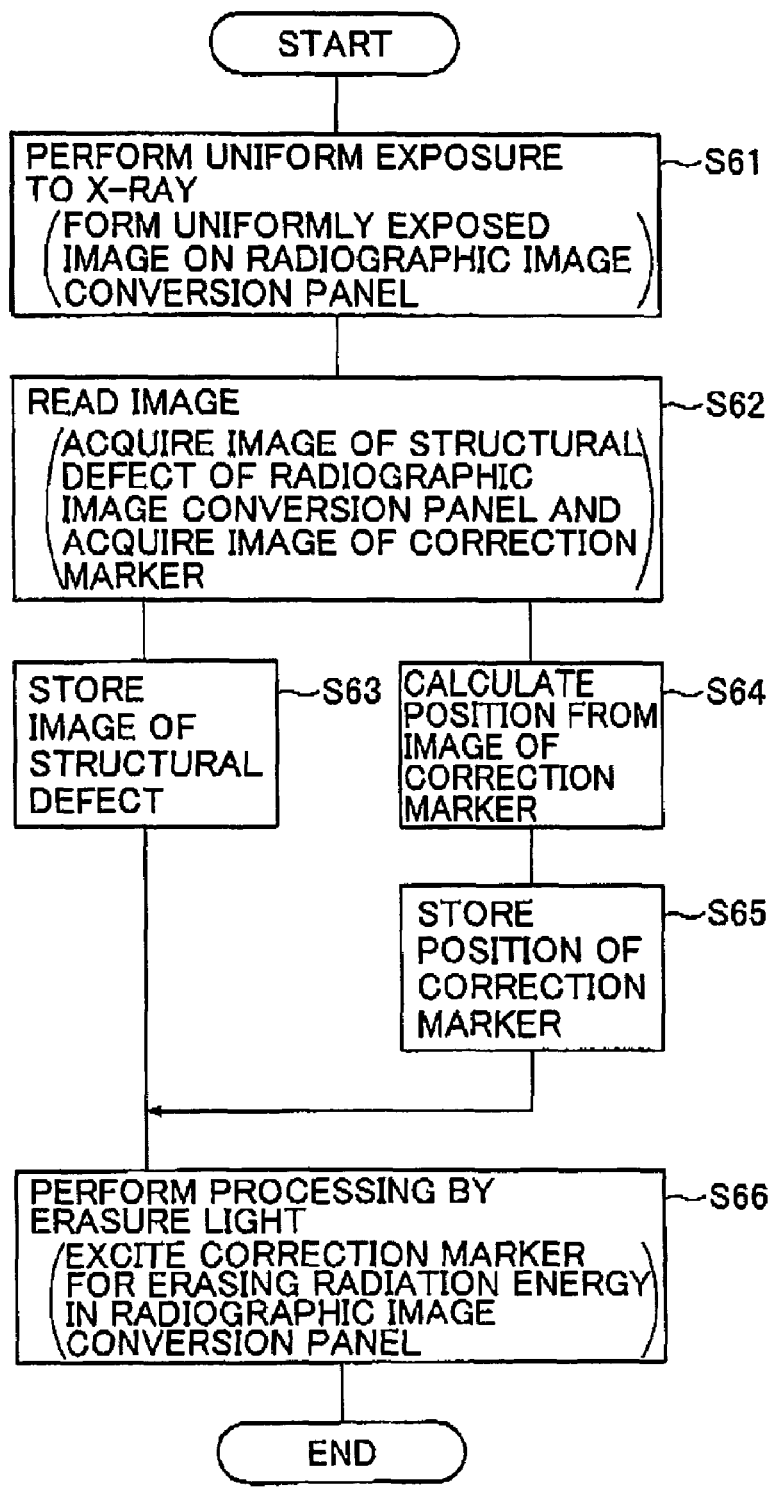
FIG. 6 is a flowchart (I) showing an image reading procedure in a radiographic image reading apparatus according to an embodiment.
Figure 7:
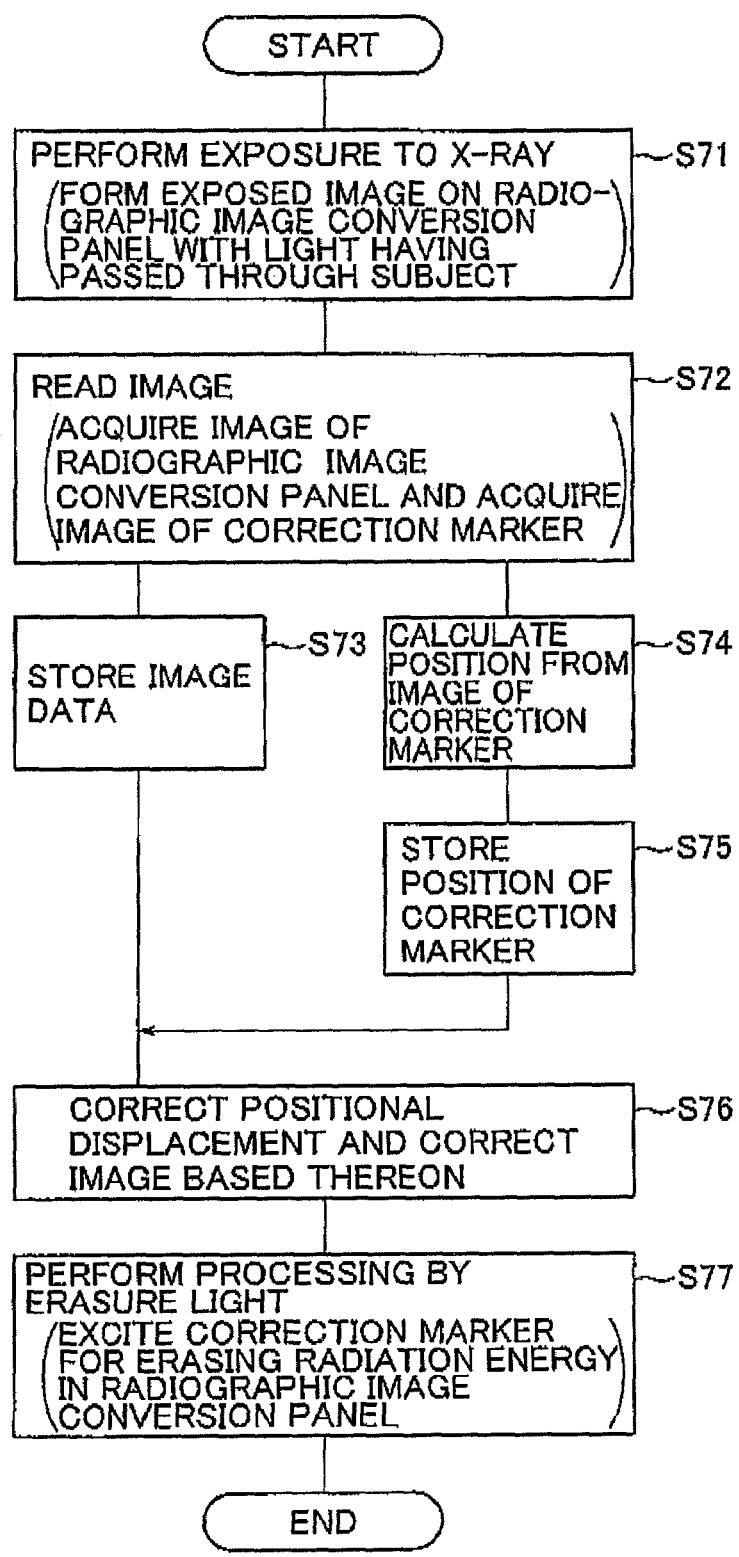
FIG. 7 is a flowchart (II) showing an image reading procedure in the radiographic image reading apparatus according to an embodiment.

Next, the function in the radiographic image reading apparatus and the operation control in the control section 40 according to the above embodiment will be described, using operation flow charts shown in FIG. 6 (operation of acquiring a radiographic image for correction), and FIG. 7 (operation for acquiring a subject radiographic image including a structural defect) a subject.

First, the case of acquiring a radiographic image for correction for detecting the position of a structural defect, under the operation control of the control section 30 will be described (see FIG. 6), Herein, it is assumed that the radiographic image reading apparatus has been subjected to erasure processing after the previous X-ray photographing and image reading (Step S66 described later). Thus, the radiographic image conversion panel 1 is in a standby state of excitation (exposure/photographing) with an X-ray, and the correction marker 2a has been excited (an image has been recorded).

The panel base 71 is moved to a side (+Z direction in FIG. 2) opposite to a side of the apparatus base 80 by the panel base moving section 70, whereby the radiographic image conversion panel 1 is placed at a radiographic image recording position W (see FIG. 4). At this position, the radiographic image conversion panel 1 is uniformly exposed to a radiation Xe without using a subject, whereby a radiographic image (hereinafter, referred to as a uniformly exposed image) is recorded (Step S61). At this time, the reading section 50 is placed at a retreated position P1 on the side of the rail base 76b.

After the recording of the uniformly exposed image to the radiographic image conversion panel 1 is completed, the panel base 71 is moved to the side (−Z direction in the figure) of the apparatus base 80 by the panel base moving section 70, whereby the radiographic image conversion panel 1 is moved to the radiographic image reading position R, and the uniformly exposed image recorded on the radiographic image conversion panel 1 at this position and the position (image) of the correction marker 2a are read. More specifically, the reading section 50 is moved by the linear slide system 75, whereby the reading section 50 is placed at a reading start position P2 on the radiation image conversion panel 1. While the reading section 50 is being moved from the rail base 76b side to the rail base 76a side (arrow D1 direction in FIG. 5) by the linear slide system 75, a linear exciting light beam Le is irradiated from the light source 10 by the reading section 50, and a stimulating light beam generated from the radiographic image conversion panel 1 as a result of the irradiation with the linear exciting light beam Le is received by the CCD element 33 through the exciting light beam cut-filter 32, and image data representing a uniformly exposed image that is A/D converted to be recorded on the radiographic image conversion panel 1 is acquired (Step S62) (see FIG. 5).

Image data for correction representing a radiographic image for correction is acquired by uniformly subtracting standard bias data representing a predetermined brightness from the image data to be stored in the image memory for correction 63 (Step S63).

At this time, the light generated from the correction marker 2a having been irradiated with the liner exciting light beam Le from the light source 10 is read through the exciting light beam cut-filter 32, and the data is transmitted to the image data processing section 60. Herein, the position of the correction marker 2a is calculated using an algorithm described later (Step S64). The data on the position of the correction marker 2a is also stored in the image memory for correction 63 (Step S65).

The above-mentioned image data for correction and position data are successively stored in the image memory for correction 63 through the A/D converter 61 and the image buffer 62 for each line in the main scanning X direction. When the reading section 50 is moved to an end position P3 on the rail base 76a side, reading of a radiographic image recorded in the radiographic image conversion panel 1 is completed, and image data for correction representing a radiographic image for correction is stored in the image memory for correction 63.

After that, the fluorescent lamp for erasure 39 provided in the reading section 50 placed at the end position P3 irradiates erasure light toward the radiographic image conversion panel 1 while being moved toward the rail base 76b (the arrow D2 direction in FIG. 5) together with the reading section 50, and erases radiation energy remaining in the radiographic image conversion panel 1 (Step S66). This enables the radiographic image conversion panel 1 to record a radiographic image again, and causes the correction marker 2a to be in an excited state with the fluorescent lamp (an image has been recorded).

Next, the case of acquiring a subject radiographic image (actual image) of a subject, under the operation control of the control section 40 will be described (see FIGS. 7 and 8).

Herein, it is also assumed that the radiographic image reading apparatus is in a state subjected to erasure processing after the previous X-ray photographing and image reading, and the radiographic image conversion panel 1 is in an X-ray excitation (exposure and photographing) standby state, and the correction marker 2a has been excited (an image has been recorded).

The panel base 71 is moved in the +Z direction by the panel base moving section 70, whereby the radiographic image conversion panel 1 is placed at the radiographic image recording position W (see FIG. 4), and at this position, the radiographic image conversion panel 1 is exposed to the radiation Xe through the subject 9, whereby a radiographic image of the subject 9 is record on the radiographic image conversion panel 1 (Step S71).

After the recording of the radiographic image of the subject 9 to the radiographic image conversion panel 1 is completed, the panel base 71 is moved in the −Z direction by the panel base moving section 70, whereby the radiographic image conversion panel 1 is moved to the radiographic image reading position R, and at this position, the radiographic image recorded on the radiographic image conversion panel 1 is read in the same way as in the above (Step S72), whereby image data representing the radiographic image of the subject 9 recorded on the radiographic image conversion panel 1, i.e., the subject image data representing a subject radiographic image is acquired. The subject image data is stored in the subject image memory 64 through the A/D converter 61 and the image buffer 62 (Step S73).

At this time, the light generated from the correction marker 2a provided on the radiographic image conversion panel 1 as a result of the irradiation of the exciting light beam Le is read through the exciting light beam cut-filter 32, and the position of the correction marker 2a is calculated from the data as described above (Step S74). The data on the position of the correction marker 2a is also stored in the image memory for correction 63 (Step S75).

The correction operating section 65 receives the image data for correction from the image memory for correction 63, and receives the subject image data from the subject image memory 64, and corrects the position regarding both the image data on the radiographic image conversion panel 1 from the data on the position of the correction marker 2a. After that, the subject image data is subjected to processing of subtracting the influence of a structural defect based on the image data for correction, whereby corrected image data G representing a processed radiographic image is acquired to be outputted (Step S76). This will be described in detail later.

After that, the fluorescent lamp for erasure 39 provided in the reading section 50 placed at the end position P3 irradiates erasure light toward the radiographic image conversion panel 1 while being moved toward the rail base 76b (the arrow D2 direction in FIG. 5) together with the reading section 50, and erases the radiation energy remaining in the radiographic image conversion panel 1 (Step S77). This enables the radiographic image conversion panel 1 to record a radiographic image again and causes the correction marker 2a to be in an excited state (an image has been recorded) with a fluorescent lamp.

Herein, the contents of the image data correction processing performed in the correction operating section 65 will be described in detail (see FIGS. 8A to 10).

Figure 8A:
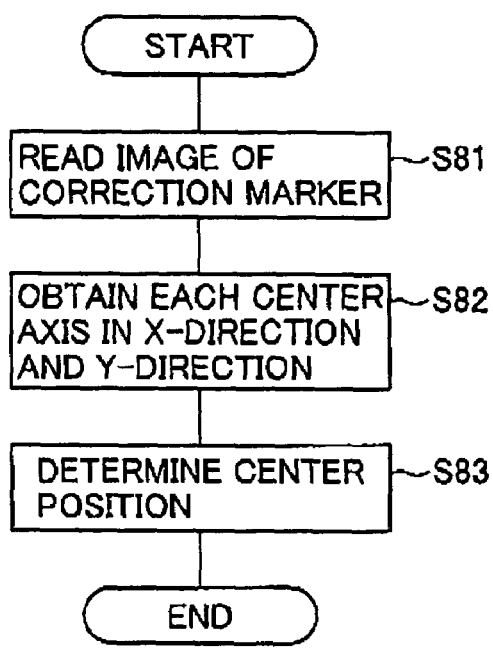
FIGS. 8A and 8B are flowcharts (III) each showing an image reading procedure in the radiographic image reading apparatus according to an embodiment.
Figure 8B:
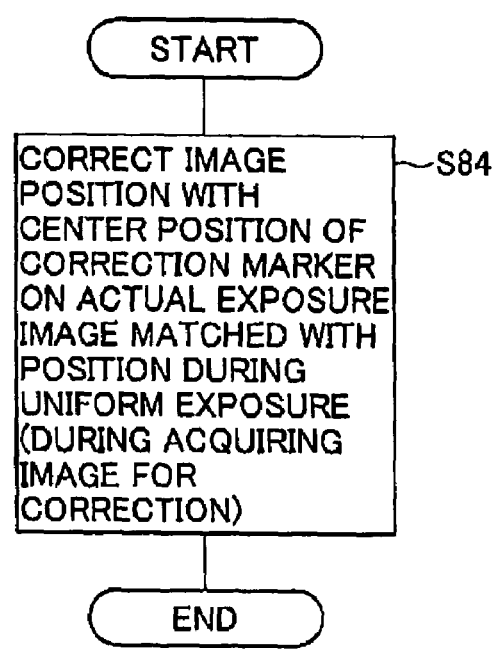

FIGS. 8A and 8B show an outline of the image data correction processing performed in the correction operating section 65. FIG. 8A shows an image reading procedure of the correction marker 2a in the case where the radiographic image conversion panel 1 and the correction marker 2a are excited and uniformly exposed to an X-ray to form an image on the radiographic image conversion panel 1, and the image is irradiated with an exciting light beam for reading, and in the case where the radiographic image conversion panel 1 and the correction marker 2a are excited, an image is formed with an X-ray passing through a subject, and the image is irradiated with an exciting light beam for reading.

The image reading procedure in the image region 1a of the radiographic image conversion panel 1 in the above-mentioned two cases is not different from an ordinary image reading procedure. FIG. 8B shows a procedure of the processing of determining the position of the correction marker 2a on the radiographic image conversion panel 1 together with the image reading of the correction marker 2a shown in FIG. 8A in the above-mentioned two cases.

FIGS. 9A and 9B respectively show an image formed in the image region 1a on the radiographic image conversion panel 1. FIG. 9A shows structural defects 7 (7a, 7b, 7c, 7d, 7e, and so on) present in the image region 1a of the radiographic image conversion panel 1. An image 1b acquired by an X-ray passing through a subject shown in FIG. 9B includes the above-mentioned structural defects 7 (7a, 7b, 7c, 7d, 7e, and so on).

In the image data correction processing performed in the correction operating section 65, first, erasure processing is performed, and then, while the radiographic image conversion panel 1 is placed in an X-ray excitation (exposure/photographing) standby state and the correction marker 2a in an image recorded state, a uniform X-ray is irradiated so that a so-called uniform image is formed on the radiographic image conversion panel 1. In this case, the energy state of the correction marker 2a does not change.

Next, a predetermined exciting light beam is irradiated, and as shown in FIG. 8A, the image formed in the image region 1a of the radiographic image conversion panel 1, and the image formed previously in the correction marker 2a are read. Step S81 corresponds to the step of reading an image (reading an image for correction) of the correction marker 2a.

In Steps S82 and S83, using the image of the correction marker 2a read in Step S81, the processing of determining the position of the correction marker 2a is performed in accordance with the procedure as shown in FIGS. 10A-10C.

More specifically, first as shown in FIG. 10A, the correction marker 2a is scanned respectively in the X-direction and the Y-direction of the correction marker 2a to measure the concentration, a profile (see FIGS. 10B and 10C) in each of the X-direction and the Y-direction is obtained, and the position (center point in FIG. 10A) of the correction marker 2a is determined based on the position coordinate at the center.

After the erasure processing, similarly, when the radiographic image conversion panel 1 is in an X-ray excitation (exposure/photographing) standby state, an image is formed with an X-ray passing through a subject. As described above, in this case also, the correction marker 2a does not change.

Next, in the same way as above, a predetermined exciting light beam is irradiated, and the reading of the image acquired by the irradiation and the image formed previously in the correction marker 2a is performed as shown in FIG. 8A (Step S81).

Further, also in the same way as above, using the image of the correction marker 2a read in Step S81, the position of the correction marker 2a is determined in accordance with the procedure as shown in FIGS. 10A-10C (Steps S82 and S83).

Next, the positioning error of the radiographic image conversion panel 1 in those two X-ray photographings is obtained. The positioning error may be obtained by calculating a displacement, as shown in Step S84 of FIG. 8B, based on the position of the correction marker 2a in the acquired image determined in the above method.

Then, based on the positional displacement amount obtained herein, the position of the image in the image region 1a of the radiographic image conversion panel 1 is corrected, and an image for correction is subtracted from an image in the image region 1a, whereby a structural defect included in the radiographic image conversion panel 1 is removed from the image in the image region 1a.

Since the correction marker 2a always indicates the same position in the radiographic image conversion panel 1, even in the case where the attachment (arrangement) position (i.e., the relative position between the radiographic image conversion panel 1 and the line sensor 30) to the radiographic image recording and reading apparatus of the radiographic image conversion panel 1 changes, the displacement amount with respect to the correct position can be obtained correctly.

Thus, the procedure of acquiring an image of high quality by removing the influence (a kind of noise) of a defect of the radiographic image conversion panel 1 including a structural defect, using the radiographic image reading apparatus according to this embodiment, has been described.

The above procedure is described merely as an example of the present invention, and the present invention is not limited thereto. For example, an algorithm for specifying the position from an image of the correction marker is not limited to the above-mentioned one, and various methods as illustrated below can be used.

First, as a method similar to the above-mentioned example, there is a method of obtaining an average value (median value) between the concentration of a background portion and the concentration of a correction marker portion, and setting the center of the median value area to be the position of the marker.

Further, there is a method of capturing a rapid change in a derivative of the concentration in the boundary portion between the background portion and the marker portion, and setting the median between them to be the position of the marker.

The correction marker according to this embodiment is extremely unique in that an accumulative phosphor having light-emission characteristics different from those of the first accumulative phosphor for forming an image is used, and a light source with a wavelength that acts as erasure light with respect to the first accumulative phosphor is used. In the case where such materials other than those illustrated are found, needless to say, they can be used preferably for the radiographic image conversion panel according to the present invention, and the radiographic image acquisition system using the panel.

Further, the number of correction markers provided on the radiographic image conversion panel may be an arbitrary number of one or more, and it is also possible to provide the same number of correction marks as that of scanners, and read the radiographic image conversion panel in a divided and parallel manner.

Herein, in the case where there is a possibility that the second accumulative phosphor causes fading (decrease in light-emission ability) during the elapse of time after the excitation by the irradiation with a primarily exciting light beam, and a sufficient light amount of light-emission cannot be obtained at a time of secondary excitation, the following measures are preferably performed. Although FIGS. 11 to 15 show some specific exemplary methods, the present invention is not limited thereto.

It is preferable that the following (compensation) measures are performed, for example, under the control of a fading countermeasure section (in the figure, abbreviated as an F countermeasure section) 52 provided in the reading section 50. The fading control in the F countermeasure section 52 is carried out by controlling, through the control section 40, the operation of each section including the reading section 50, in the radiographic image reading apparatus, (1) There is provided a method of performing primary excitation with a predetermined primarily exciting light beam after the start-up of the radiographic image acquisition system (see FIG. 11).

This method is a most basic fading compensation method, and according to this method, primary excitation of a correction marker with a predetermined primarily exciting light beam is performed (Step S102) after the start-up of the radiographic image acquisition system (Step S100).

Figure 12:
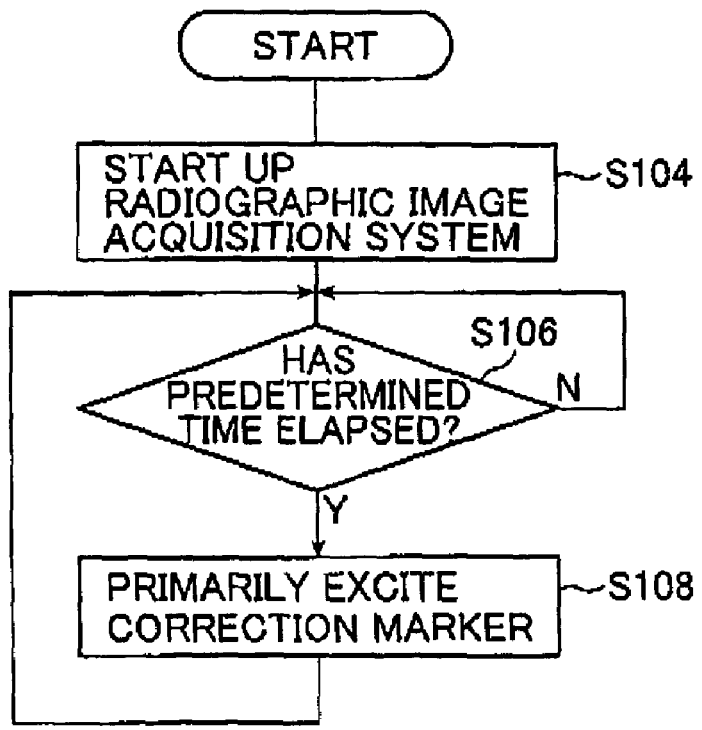
FIG. 12 is a flowchart (II) showing an exemplary method of addressing fading of the second accumulative phosphor in the radiographic image acquisition system.

(2) There is provided a method of performing primary excitation with a predetermined primarily exciting light beam at a predetermined time interval after the start-up of the radiographic image acquisition system (see FIG. 12).

This method is a basic fading compensation method following the method described in the item (1). According to this method, in the case where, for example, the radiographic image acquisition system is used for a CR apparatus, since it is placed in a long-term continuous operation state in most cases, during this time, the fading of the second accumulative phosphor is also monitored continuously.

According to this method, after the start-up of the radiographic image acquisition system (Step S104), for each elapse of a predetermined time (Step S106), primary excitation of the correction marker with a predetermined primarily exciting light beam is repeated (processing is repeated between Step S108 and Step S106). The predetermined time in this case may be appropriately determined in accordance with the kind, use period, use frequency, and the like of the secondary accumulative phosphor.

Figure 13:
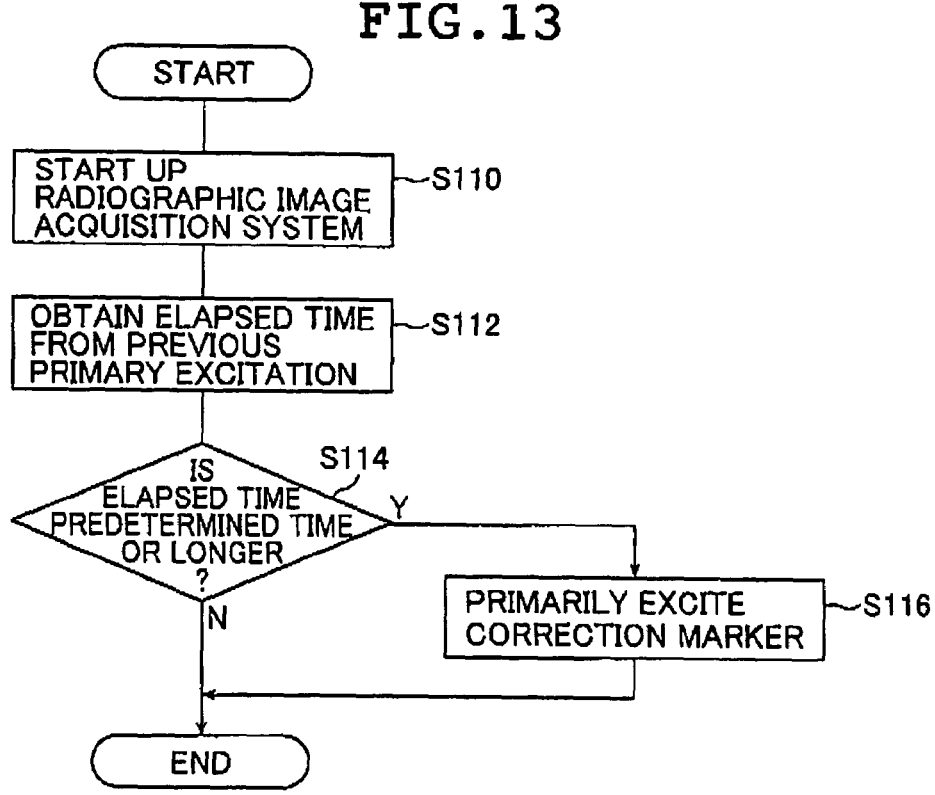
FIG. 13 is a flowchart (III) showing an exemplary method of addressing fading of the second accumulative phosphor in the radiographic image acquisition system.

(3) There is provided a method of determining whether or not primary excitation with a predetermined primarily exciting light beam is performed based on the elapse time from the previous primary excitation, after the start-up of the radiographic image acquisition system (see FIG. 13).

According to this method, during the start-up, the influence of a hitherto suspension time of the system on the second accumulative phosphor is also considered.

According to this method, after the start-up of the radiographic image acquisition system (Step S110), an elapse time from the previous primary excitation is obtained (Step S112). In the case where the obtained elapse time is a predetermined value or more (Y in Step S114), the primary excitation of the correction marker with a predetermined primarily exciting light beam is performed (Step S116). The predetermined time in this case may also be appropriately determined in accordance with the kind, use period, use frequency, and the like of the second accumulative phosphor.

Figure 14:
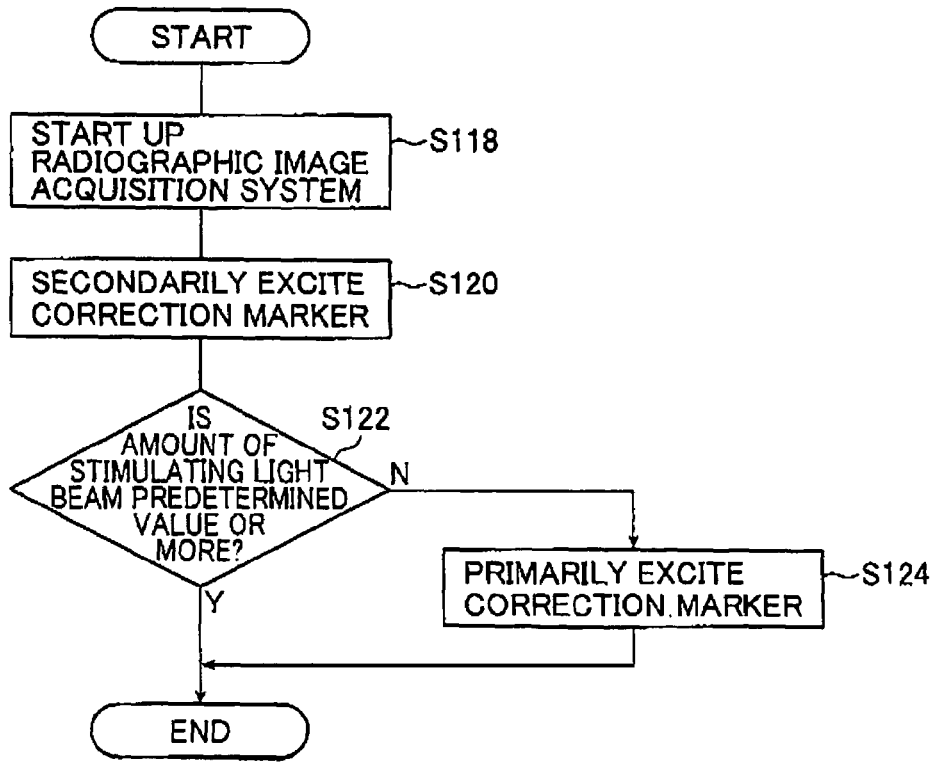
FIG. 14 is a flowchart (IV) showing an exemplary method of addressing fading of the second accumulative phosphor in the radiographic image acquisition system.

(4) There is provided a method of determining whether or not the primary excitation with a predetermined primarily exciting light beam is performed based on the amount of a stimulating light beam emitted by irradiating the second accumulative phosphor with a predetermined secondarily exciting light beam, after the start-up of the radiographic image acquisition system (see FIG. 14).

According to this method, during the start-up, actual stimulating light-emission ability of the second accumulative phosphor itself is checked, and it is determined whether or not the primary excitation of the correction marker is required in accordance with the value.

According to this method, after the start-up of the radiographic image acquisition system (Step S118), the correction marker is secondarily excited with a predetermined exciting light beam (Step S120). In the case where the value of the amount of a stimulating light beam at this time is less than a predetermined value (N in Step S122), the primary excitation of the correction marker with a predetermined primarily exciting light beam is performed (Step S124). The value of the amount of a stimulating light beam in this case may also be determined appropriately in accordance with the kind, use period, use frequency, and the like of the second accumulative phosphor.

Figure 15:
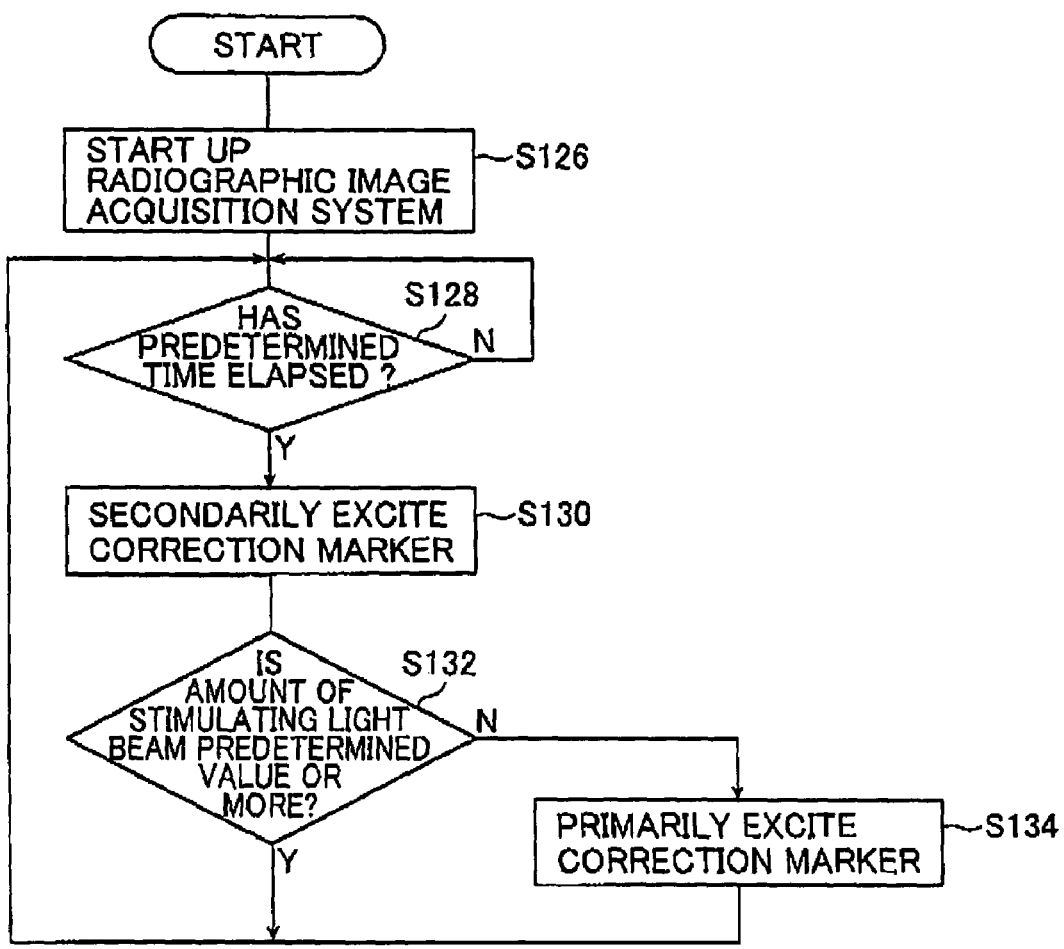
FIG. 15 is a flowchart (V) showing an exemplary method of addressing fading of the second accumulative phosphor in the radiographic image acquisition system.

(5) There is provided a method of determining whether or not the primary excitation with a predetermined primarily exciting light beam is performed based on the amount of a stimulating light beam emitted by irradiating the second accumulative phosphor with a predetermined secondarily exciting light beam after the elapse of a predetermined time from the start-up of the radiographic image acquisition system (see FIG. 15).

This method is obtained by altering the method described in the item (4) so that the method of the item (4) is performed continuously. Similarly to the method as described in the item (2), in the case where the radiographic image acquisition system is placed in a long-term continuous operation state, the fading of the second accumulative phosphor during the time is monitored continuously.

According to this method, after the start-up of the radiographic image acquisition system (Step S126), for each elapse of a predetermined time (Step S128), the correction marker is secondarily excited with a predetermined exciting light beam (Step S130). In the case where the value of the amount of a stimulating light beam at the time is less than a predetermined value (N in Step S132), the primary excitation of the correction marker with a predetermined primarily exciting light beam is repeated (processing is repeated between Step S134 and Step S128).

The predetermined time, and the value of the amount of a stimulating light beam in this case may also be determined appropriately depending upon the kind, use period, use frequency, and the like of the second accumulative phosphor.

Further, the predetermined time and the value of the amount of a stimulating light beam may be previously obtained by computer simulation, experiment, or the like, and the characteristics thereof may be preferably shown in a table (LUT: look-up table).

Still further, generally, a plurality of correction markers are placed, so that various countermeasure methods such as a method of performing the same compensation with respect to all the second accumulative phosphors based on, as a reference, the second accumulative phosphor with the largest fading among the plurality of correction markers and a method of addressing individually each correction marker can be performed.

As described above in detail, according to the radiographic image acquisition system according to the present invention, even in the case where there is a fear that the second accumulative phosphor constituting the correction marker causes fading (decrease in light-emission ability) during the elapse of time after the excitation by the irradiation with a primarily exciting light beam, and a sufficient light amount of light-emission cannot be obtained at a time of secondary excitation, the position in the radiographic image conversion panel at which a radiographic image is acquired can be specified, whereby a radiographic image conversion panel and a radiographic image acquisition system can be provided, enabling a radiographic image of high quality with the influence of light-emission unevenness of a stimulating light beam removed more exactly to be acquired.

The above-mentioned embodiment and the like all show examples of the present invention, and it is needless to say that they can be appropriately modified and altered without departing the gist of the present invention.

For example, as described above, it is also preferable that, in the case of primarily exciting the second accumulative phosphor with a primarily exciting light beam in the radiographic image acquisition system, the conditions (the amount of an exciting light beam, irradiation time, etc.) are changed in accordance with the elapsed time, the elapsed time and the amount of the stimulating light beam emitted at a time of the previous primary excitation, and further, the amount of the stimulating light beam.

Further, the methods of compensating for the fading of the second accumulative phosphor shown in the above items (1) to (5) may be used in an appropriate combination.

What is claimed is:

1. A radiographic image conversion panel, comprising:
   a recording layer formed of a first accumulative phosphor that is irradiated with a radiation as a first primarily exciting light beam to excite primarily and accumulate energy, and is irradiated with a first secondarily exciting light beam to excite secondarily and generate a stimulating light beam; and
   a correction marker for detecting a position which is formed of a second accumulative phosphor that is irradiated with a second primarily exciting light beam to excite primarily and accumulate the energy, and is irradiated with a second secondarily exciting light beam to excite secondarily and generate light with a wavelength shorter than a wavelength of said first secondarily exciting light beam, wherein said second primary exciting light beam is different from said first primary exciting light beam.

2. The radiographic image conversion panel according to claim 1, wherein said correction marker is provided outside of an image recording region of said recording layer.

3. The radiographic image conversion panel according to claim 1, further comprising a supporting substrate, wherein said correction marker is provided on a part of said supporting substrate.

4. The radiographic image conversion panel according to claim 1, wherein said second primarily exciting light beam is light capable of erasing the energy accumulated in said first accumulative phosphor and said second secondarily exciting light beam is said first secondarily exciting light beam capable of secondarily exciting said first accumulative phosphor.

5. A radiographic image acquisition system using a radiographic image conversion panel which comprises:
   a recording layer formed of a first accumulative phosphor that is irradiated with a radiation as a first primarily exciting light beam to excite primarily and accumulate energy, and is irradiated with a first secondarily exciting light beam to excite secondarily and generate a stimulating light beam; and
   a correction marker for detecting a position which is formed of a second accumulative phosphor that is irradiated with a second primarily exciting light beam to excite primarily and accumulate the energy, and is irradiated with a second secondarily exciting light beam to excite secondarily and generate light with a wavelength shorter than a wavelength of said first secondarily exciting light beam, wherein said second primary exciting light beam is different from said first primary exciting light beam, said radiographic image acquisition system comprising:
   an exciting light source or sources from that said first and second secondarily exciting light beams are radiated on said radiographic image conversion panel;
   detecting means for receiving a first stimulating light beam that is generated by said first accumulative phosphor on said recording layer of said radiographic image conversion panel when said first accumulative phosphor is irradiated with said first secondarily exciting light beam from said exciting light source or sources, and a second stimulating light beam that is generated by said second accumulative phosphor on said correction marker of said radiographic image conversion panel when said second accumulative phosphor is irradiated with said second secondarily exciting light beam from said exciting light source or sources, and acquiring a radiographic image signal representing a radiographic image recorded as a latent image on said radiographic image conversion panel, and a marker image signal representing an image of said correction marker; and
   light-emission unevenness correcting means for correcting a position of each of radiographic images represented by radiographic image signals based on a position of said image of said correction marker represented by said marker image signal from said radiographic image signals related to uniform radiation exposure and radiation exposure photographing a subject and thereafter, acquiring a corrected image signal representing a radiographic image that a influence by light-emission unevenness of said first stimulating light beam is removed, using said radiographic image signals whose position is corrected.

6. The radiographic image acquisition system according to claim 5, further comprising a control section that controls said exciting light source or sources in such a way that primary excitation on said second accumulative phosphor constituting said correction marker is performed by said second primarily exciting light beam at a start-up of said radiographic image acquisition system.

7. The radiographic image acquisition system according to claim 5, further comprising a control section that controls said exciting light source or sources in such a way that primary excitation on said second accumulative phosphor constituting said correction marker is performed by said second primarily exciting light beam at a predetermined time interval after a start-up of said radiographic image acquisition system.

8. The radiographic image acquisition system according to claim 5, further comprising a control section that determines whether or not primary excitation on said second accumulative phosphor constituting said correction marker is performed by said second primarily exciting light beam based on an elapse of time from a previous primary excitation at a start-up of said radiographic image acquisition system.

9. The radiographic image acquisition system according to claim 5, further comprising a control section that determines whether or not primary excitation on said second accumulative phosphor constituting said correction marker is performed by second primarily exciting light beam based on an elapse of time from a previous primary excitation and a light amount of said second stimulating light beam emitted at a time of a previous secondary excitation at a start-up of said radiographic image acquisition system.

10. The radiographic image acquisition system according to claim 5, further comprising a control section that controls said exciting light source or sources in such a way that said second accumulative phosphor is irradiated with a predetermined second secondarily exciting light beam and determines whether or not primary excitation on said second accumulative phosphor constituting said correction marker is performed by second primarily exciting light beam based on a light amount of said second stimulating light beam generated at this time at a start-up of said radiographic image acquisition system or after an elapse of a predetermined time from said start-up of said radiographic image acquisition system.

11. The radiographic image acquisition system according to claim 5, wherein said radiographic image signal and said marker image signal related to said uniform radiation exposure are a radiographic image signal and a marker image signal detected by said detecting means from said radiographic image conversion panel that is irradiated with a uniform radiation, and said radiographic image signal and said marker image signal related to said radiation exposure photographing said subject are a radiographic image signal and a marker image signal detected by said detecting means from said same radiographic image conversion panel on which said subject is photographed.

12. The radiographic image acquisition system according to claim 5, further comprising an imaging optical system through which said first and second stimulating light beams are focused on a surface of said detecting means.

13. The radiographic image acquisition system according to claim 5, wherein said correction marker is provided outside of an image recording region of said recording layer.

14. The radiographic image acquisition system according to claim 5, further comprising a supporting substrate, wherein said correction marker is provided on a part of said supporting substrate.

15. The radiographic image acquisition system according to claim 5, wherein said second primarily exciting light beam is light capable of erasing the energy accumulated in said first accumulative phosphor and said second secondarily exciting light beam is said first secondarily exciting light beam capable of secondarily exciting said first accumulative phosphor.

16. A radiographic image conversion panel, comprising:
a recording layer formed of a first accumulative phosphor that is irradiated with a radiation as a first primarily exciting light beam to excite primarily and accumulate energy, and is irradiated with a first secondarily exciting light beam to excite secondarily and generate a stimulating light beam; and
a correction marker for detecting a position which is formed of a second accumulative phosphor that is irradiated with a second primarily exciting light beam to excite primarily and accumulate the energy, and is irradiated with a second secondarily exciting light beam to excite secondarily and generate light with a wavelength shorter than a wavelength of beam, wherein said second primarily exciting light beam is light capable of erasing the energy accumulated in said first accumulative phosphor and said second secondarily exciting light beam is said first secondarily exciting light beam capable of secondarily exciting said first accumulative phosphor.

17. A radiographic image acquisition system using a radiographic image conversion panel which comprises:
a recording layer formed of a first accumulative phosphor that is irradiated with a radiation as a first primarily exciting light beam to excite primarily and accumulate energy, and is irradiated with a first secondarily exciting light beam to excite secondarily and generate a stimulating light beam; and
a correction marker for detecting a position which is formed of a second accumulative phosphor that is irradiated with a second primarily exciting light beam to excite primarily and accumulate the energy, and is irradiated with a second secondarily exciting light beam to excite secondarily and generate light with a wavelength shorter than a wavelength of said first secondarily exciting light beam, said radiographic image acquisition system comprising:
an exciting light source or sources from that said first and second secondarily exciting light beams are radiated on said radiographic image conversion panel;
detecting means for receiving a first stimulating light beam that is generated by said first accumulative phosphor on said recording layer of said radiographic image conversion panel when said first accumulative phosphor is irradiated with said first secondarily exciting light beam from said exciting light source or sources, and a second stimulating light beam that is generated by said second accumulative phosphor on said correction marker of said radiographic image conversion panel when said second accumulative phosphor is irradiated with said second secondarily exciting light beam from said exciting light source or sources, and acquiring a radiographic image signal representing a radiographic image recorded as a latent image on said radiographic image conversion panel, and a marker image signal representing an image of said correction marker; and
light-emission unevenness correcting means for correcting a position of each of radiographic images represented by radiographic image signals based on a position of said image of said correction marker represented by said marker image signal from said radiographic image signals related to uniform radiation exposure and radiation exposure photographing a subject and thereafter, acquiring a corrected image signal representing a radiographic image that a influence by lighten-emission unevenness of said first stimulating light beam is removed, using said radiographic image signals whose position is corrected, wherein said second primarily exciting light beam is light capable of erasing the energy accumulated in said first accumulative phosphor and said second secondarily exciting light beam is said first secondarily exciting light beam capable of secondarily exciting said first accumulative phosphor.

18. A radiographic image acquisition system using a radiographic image conversion panel which comprises:
a recording layer formed of a first accumulative phosphor that is irradiated with a radiation as a first primarily exciting light beam to excite primarily and accumulate energy, and is irradiated with a first secondarily exciting light beam to excite secondarily and generate a stimulating light beam; and
a correction marker for detecting a position which is formed of a second accumulative phosphor that is irradiated with a second primarily exciting light beam to excite primarily and accumulate the energy, and is irradiated with a second secondarily exciting light beam to excite secondarily and generate light with a wavelength shorter than a wavelength of said first secondarily exciting light beam, said radiographic image acquisition system comprising:
an exciting light source or sources from that said first and second secondarily exciting light beams are radiated on said radiographic image conversion panel;
detecting means for receiving a first stimulating light beam that is generated by said first accumulative phosphor on said recording layer of said radiographic image conversion panel when said first accumulative phosphor is irradiated with said first secondarily exciting light beam from said exciting light source or sources, and a second stimulating light beam that is generated by said second accumulative phosphor on said correction marker of said radiographic image conversion panel when said second accumulative phosphor is irradiated with said second secondarily exciting light beam from said exciting light source or sources, and acquiring a radiographic image signal representing a radiographic image recorded as a latent image on said radiographic image conversion panel, and a marker image signal representing an image of said correction marker;
light-emission unevenness correcting means for correcting a position of each of radiographic images represented by radiographic image signals based on a position of said image of said correction marker represented by said marker image signal from said radiographic image signals related to uniform radiation exposure and radiation exposure photographing a subject and thereafter, acquiring a corrected image signal representing a radiographic image that a influence by light-emission unevenness of said first stimulating light beam is removed, using said radiographic image signals whose position is corrected; and
a control section that controls said exciting light source or sources in such a way that primary excitation on said second accumulative phosphor constituting said correction marker is performed by said second primarily exciting light beam at a predetermined time interval after a start-up of said radiographic image acquisition system.

19. A radiographic image acquisition system using a radiographic image conversion panel which comprises:
a recording layer formed of a first accumulative phosphor that is irradiated with a radiation as a first primarily exciting light beam to excite primarily and accumulate energy, and is irradiated with a first secondarily exciting light beam to excite secondarily and generate a stimulating light beam; and
a correction marker for detecting a position which is formed of a second accumulative phosphor that is irradiated with a second primarily exciting light beam to excite primarily and accumulate the energy, and is irradiated with a second secondarily exciting light beam to excite secondarily and generate light with a wavelength shorter than a wavelength of said first secondarily exciting light beam, said radiographic image acquisition system comprising:
an exciting light source or sources from that said first and second secondarily exciting light beams are radiated on said radiographic image conversion panel;
detecting means for receiving a first stimulating light beam that is generated by said first accumulative phosphor on said recording layer of said radiographic image conversion panel when said first accumulative phosphor is irradiated with said first secondarily exciting light beam from said exciting light source or sources, and a second stimulating light beam that is generated by said second accumulative phosphor on said correction marker of said radiographic image conversion panel when said second accumulative phosphor is irradiated with said second secondarily exciting light beam from said exciting light source or sources, and acquiring a radiographic image signal representing a radiographic image recorded as a latent image on said radiographic image conversion panel, and a marker image signal representing an image of said correction marker;
light-emission unevenness correcting means for correcting a position of each of radiographic images represented by radiographic image signals based on a position of said image of said correction marker represented by said marker image signal from said radiographic image signals related to uniform radiation exposure and radiation exposure photographing a subject and thereafter, acquiring a corrected image signal representing a radiographic image that a influence by light-emission unevenness of said first stimulating light beam is removed, using said radiographic image signals whose position is corrected; and
a control section that determines whether or not primary excitation on said second accumulative phosphor constituting said correction marker is performed by said second primarily exciting light beam based on an elapse of time from a previous primary excitation at a start-up of said radiographic image acquisition system.

20. A radiographic image acquisition system using a radiographic image conversion panel which comprises:
a recording layer formed of a first accumulative phosphor that is irradiated with a radiation as a first primarily exciting light beam to excite primarily and accumulate energy, and is irradiated with a first secondarily exciting light beam to excite secondarily and generate a stimulating light beam; and
a correction marker for detecting a position which is formed of a second accumulative phosphor that is irradiated with a second primarily exciting light beam to excite primarily and accumulate the energy, and is irradiated with a second secondarily exciting light beam to excite secondarily and generate light with a wavelength shorter than a wavelength of said first secondarily exciting light beam, said radiographic image acquisition system comprising:
an exciting light source or sources from that said first and second secondarily exciting light beams are radiated on said radiographic image conversion panel;
detecting means for receiving a first stimulating light beam that is generated by said first accumulative phosphor on said recording layer of said radiographic image conversion panel when said first accumulative phosphor is irradiated with said first secondarily exciting light beam from said exciting light source or sources, and a second stimulating light beam that is generated by said second accumulative phosphor on said correction marker of said radiographic image conversion panel when said second accumulative phosphor is irradiated with said second secondarily exciting light beam from said exciting light source or sources, and acquiring a radiographic image signal representing a radiographic image recorded as a latent image on said radiographic image conversion panel, and a marker image signal representing an image of said correction marker;
light-emission unevenness correcting means for correcting a position of each of radiographic images represented by radiographic image signals based on a position of said image of said correction marker represented by said marker image signal from said radiographic image signals related to uniform radiation exposure and radiation exposure photographing a subject and thereafter, acquiring a corrected image signal representing a radiographic image that a influence by light-emission unevenness of said first stimulating light beam is removed, using said radiographic image signals whose position is corrected; and a control section that determines whether or not primary excitation on said second accumulative phosphor constituting said correction marker is performed by second primarily exciting light beam based on an elapse of time from a previous primary excitation and a light amount of said second stimulating light beam emitted at a time of a previous secondary excitation at a start-up of said radiographic image acquisition system.

21. A radiographic image acquisition system using a radiographic image conversion panel which comprises:

a recording layer formed of a first accumulative phosphor that is irradiated with a radiation as a first primarily exciting light beam to excite primarily and accumulate energy, and is irradiated with a first secondarily exciting light beam to excite secondarily and generate a stimulating light beam; and a correction marker for detecting a position which is formed of a second accumulative phosphor that is irradiated with a second primarily exciting light beam to excite primarily and accumulate the energy, and is irradiated with a second secondarily exciting light beam to excite secondarily and generate light with a wavelength shorter than a wavelength of said first secondarily exciting light beam, said radiographic image acquisition system comprising:

an exciting light source or sources from that said first and second secondarily exciting light beams are radiated on said radiographic image conversion panel;

detecting means for receiving a first stimulating light beam that is generated by said first accumulative phosphor on said recording layer of said radiographic image conversion panel when said first accumulative phosphor is irradiated with said first secondarily exciting light beam from said exciting light source or sources, and a second stimulating light beam that is generated by said second accumulative phosphor on said correction marker of said radiographic image conversion panel when said second accumulative phosphor is irradiated with said second secondarily exciting light beam from said exciting light source or sources, and acquiring a radiographic image signal representing a radiographic image recorded as a latent image on said radiographic image conversion panel, and a marker image signal representing an image of said correction marker;

light-emission unevenness correcting means for correcting a position of each of radiographic images represented by radiographic image signals based on a position of said image of said correction marker represented by said marker image signal from said radiographic image signals related to uniform radiation exposure and radiation exposure photographing a subject and thereafter, acquiring a corrected image signal representing a radiographic image that a influence by light-emission unevenness of said first stimulating light beam is removed, using said radiographic image signals whose position is corrected; and a control section that controls said exciting light source or sources in such a way that said second accumulative phosphor is irradiated with a predetermined second secondarily exciting light beam and determines whether or not primary excitation on said second accumulative phosphor constituting said correction marker is performed by second primarily exciting light beam based on a light amount of said second stimulating light beam generated at this time at a start-up of said radiographic image acquisition system or after an elapse of a predetermined time from said start-up of said radiographic image acquisition system.

* * * * *